May 2, 1950      K. W. COATES      2,506,066
WORM NUT BRAKE FOR ADJUSTABLE END WRENCHES
Filed Jan. 15, 1948
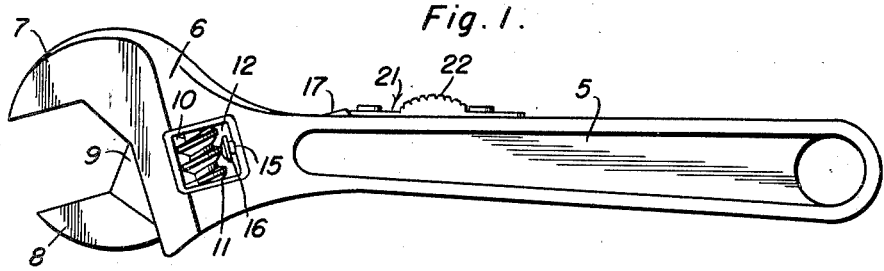
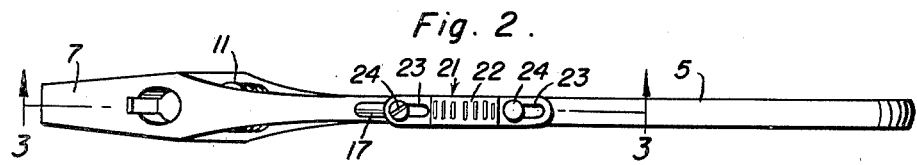
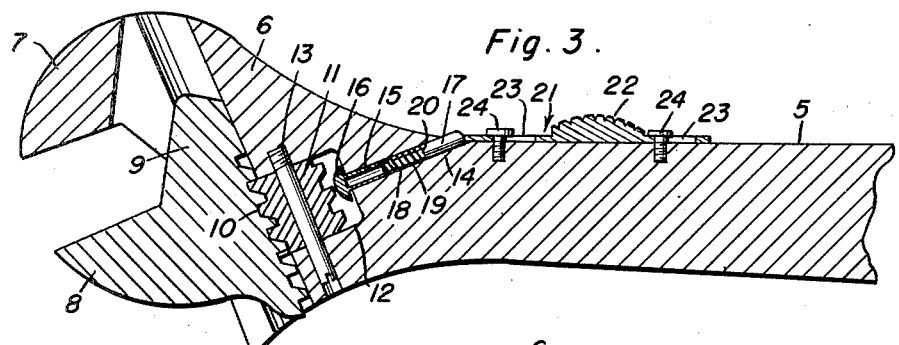
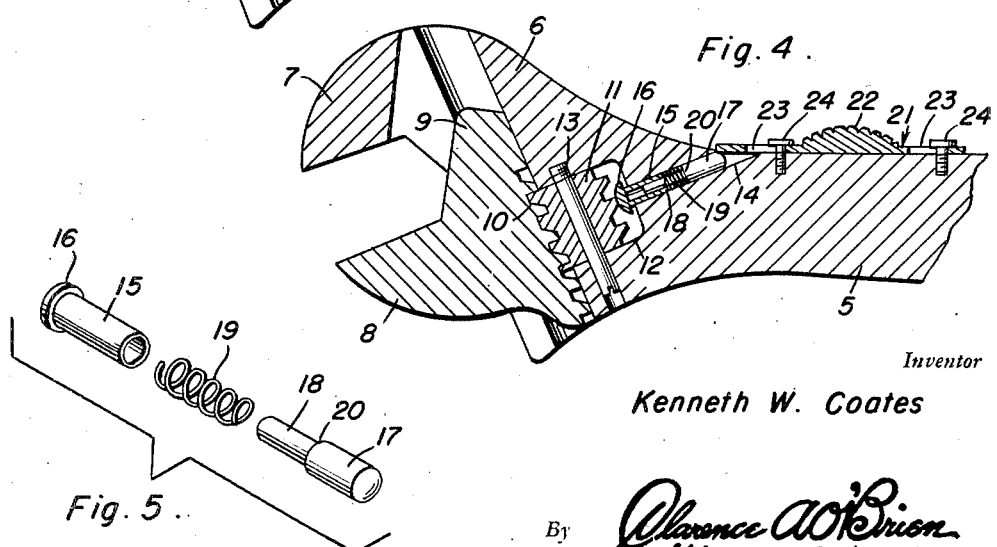
Inventor
Kenneth W. Coates
By Clarence A. O'Brien
and Harvey B. Jacobson
Attorneys Patented May 2, 1950

2,506,066

UNITED STATES PATENT OFFICE 2,506,066

WORM NUT BRAKE FOR ADJUSTABLE END WRENCHES

Kenneth W. Coates, La Porte, Ind.

Application January 15, 1948, Serial No. 2,452

2 Claims. (Cl. 81—165)

This invention relates to adjustable end wrenches, and has more particular reference to an improved manually controlled brake for holding the worm nut of such a wrench against accidental turning after it has been actuated to properly adjust the movable jaw of the wrench.

The present invention contemplates provision of an adjustable end wrench with a spring-lengthened telescopic brake pin operatively associated with the worm nut of the wrench, and a slide mounted on the wrench handle and operable to shorten and to compress the spring of the brake pin so that a brake shoe of the latter is forced into engagement with the worm nut under sufficient pressure to prevent accidental rotation of said worm nut.

The exact nature of the present invention will become apparent from the following description when considered in connection with the accompanying drawing, in which:

Figure 1 is a side elevational view of an adjustable end wrench provided with a brake in accordance with the present invention;

Figure 2 is an edge elevational view thereof;

Figure 3 is an enlarged fragmentary longitudinal section taken on the line 3—3 of Figure 2, with the brake released;

Figure 4 is a view similar to Figure 3 with the brake applied;

Figure 5 is an enlarged exploded perspective view of the brake pin.

Referring in detail to the drawing, 5 indicates the handle of the wrench having the usual enlarged head 6 terminating in a fixed jaw 7. The wrench also includes an adjustable jaw 8 provided with a shank 9 formed with the usual rack 10. A worm nut 11 is rotatably mounted in an opening 12 of the head 6 upon a bolt 13, which forms a shaft for the worm nut.

In accordance with the present invention, the handle 5 is formed with a straight cylindrical hole 14 that opens at its forward end into the opening 12 at the rear side of the latter, and that opens at its rear end through the adjacent edge of the handle 5 rearwardly of said opening 12. A spring-lengthened telescopic brake pin is mounted in the hole 14, and it includes a tubular stem 15 slidable in the forward portion of hole 14 and having a shoe 16 on its forward end which is engaged with the periphery of the thread of nut 11. The brake pin also includes a second stem 17 slidable in the rear portion of hole 14 and having a reduced forward end portion 18 slidably fitting into the tubular stem 15. A helical compression spring 19 is disposed on the reduced portion 18 of stem 17, and is interposed between the rear end of the tubular stem 15 and the shoulder 20 formed on the stem 17 by reducing the latter. The arrangement is such that when the brake pin is lengthened, with the spring expanded, the shoe 16 does not materially interfere with rotation of the worm nut 11, and the rear end of stem 17 protrudes slightly at the rear end of hole 14. By pressing the stem 17 forwardly entirely within the hole 14, the spring 19 is compressed and causes the stem 15 to press the shoe 16 to braking position or into engagement with the thread of worm nut 11 with sufficient pressure to prevent accidental turning of the latter.

Mounted for limited longitudinal movement on the edge of the handle 5 is a slide 21 which, in its rearward limit of movement, allows the slight protrusion of stem 17, but engages it to prevent the same from moving further out of the hole 14 as shown in Figure 3. When in its forward limit of movement as shown in Figure 4, the slide 21 holds the stem 17 in its forwardly pressed position entirely within the hole 14 so as to maintain the shoe 16 in braking position. The rear end of stem 17 is rounded so that the slide 21 presses said stem forwardly to apply the brake shoe upon forward movement of said slide. As shown, the slide 21 consists of an elongated plate provided with a raised finger piece 22 intermediate its ends and having longitudinally elongated slots 23 in its end portions. Screws 24 pass through the slots 23 and are threaded into the handle 5 to mount the slide on the latter.

In use, the slide 21 is simply engaged by the user's finger and moved rearwardly to the position of Figure 3 to release the brake pin so that the worm nut 11 may be freely turned for adjusting the jaw 8 to the desired position. The slide 21 is then moved forwardly so as to force the stem 17 forwardly and apply the brake as shown in Figure 4, whereupon the worm nut 11 is effectively prevented from accidentally turning to thereby effectively retain the adjustment of jaw 8.

From the foregoing description, it is believed that the construction, operation and advantages of the present invention will be readily understood and appreciated by those skilled in the art. The device is simple and may be readily applied to existing nut or pipe wrenches during or after manufacture. Modifications and changes in details of construction are contemplated, such as fall within the spirit of the invention as claimed.

What I claim as new is:

1. An adjustable end wrench comprising a handle having an enlarged head terminating in a fixed jaw and provided with an opening, an adjustable jaw provided with a shank slidably mounted in said head and formed with a rack, a worm rotatably mounted in said opening obliquely of the handle and meshing with said rack, said handle being formed with a straight obliquely extending hole that opens at its forward end into the opening at the rear side of the latter and that opens at its rear end through the adjacent side edge of the handle rearwardly of said opening, a spring-lengthened telescopic brake pin mounted in said hole, and a slide mounted on said side edge of the handle and operatively associated with the rear end of said brake pin for compressing and applying the latter upon forward movement of the slide, and for releasing said brake pin upon rearward movement of said slide, said brake pin having a shoe engaged with the periphery of the worm nut, said brake pin including a tubular stem slidable in the forward portion of said hole and having the shoe on its forward end within said opening, a second stem slidable in the rear of said hole and having a reduced forward end portion slidably fitting into the tubular stem, and a helical compression spring interposed between said stems and disposed on the reduced portion of the second stem.

2. An adjustable end wrench comprising a handle having an enlarged head terminating in a fixed jaw and provided with an opening, an adjustable jaw provided with a shank slidably mounted in said head and formed with a rack, a worm rotatably mounted in said opening obliquely of the handle and meshing with said rack, said handle being formed with a straight obliquely extending hole that opens at its forward end into the opening at the rear side of the latter and that opens at its rear end through the adjacent side edge of the handle rearwardly of said opening, a spring-lengthened telescopic brake pin mounted in said hole, and a slide mounted on said edge of the handle and operatively associated with the rear end of said brake pin for compressing and applying the latter upon forward movement of the slide, and for releasing said brake pin upon rearward movement of said slide, said brake pin having a shoe engaged with the periphery of the worm nut, said brake pin comprising telescopically associated sections, the slide allowing slight protrusion of the rear portion of the brake pin from said hole when the brake pin is released but engaging it to retain the same in said hole, said slide further being movable across the rear end of said hole to press the brake pin forwardly entirely within the hole when the brake pin is applied.

KENNETH W. COATES.

REFERENCES CITED

The following references are of record in the file of this patent:

UNITED STATES PATENTS

| Number | Name | Date |
| --- | --- | --- |
| 1,044,069 | Mossberg | Nov. 12, 1912 |
| 1,127,100 | Shuster | Feb. 2, 1915 |
| 2,309,529 | Orchard | Jan. 26, 1943 |
| 2,316,455 | Richardson | Apr. 13, 1943 |